United States Patent
Dry et al.

(10) Patent No.: US 10,518,733 B2
(45) Date of Patent: Dec. 31, 2019

(54) SEAT WITH AIRBAG

(71) Applicant: Ford Global Technologies, LLC, Dearborn, MI (US)

(72) Inventors: Alan George Dry, Grosse Pointe Woods, MI (US); Brian Robert Spahn, Plymouth, MI (US); Johnathan Andrew Line, Northville, MI (US); Marcos Silva Kondrad, Macomb Township, MI (US); Kevin Wayne Preuss, Berkley, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 89 days.

(21) Appl. No.: 15/680,927

(22) Filed: Aug. 18, 2017

(65) Prior Publication Data
US 2019/0054884 A1   Feb. 21, 2019

(51) Int. Cl.
| | |
|---|---|
| *B60R 21/207* | (2006.01) |
| *B60R 21/2338* | (2011.01) |
| *B60R 21/2342* | (2011.01) |
| *B60R 21/00* | (2006.01) |
| *B60R 21/01* | (2006.01) |

(52) U.S. Cl.
CPC ........ *B60R 21/207* (2013.01); *B60R 21/2338* (2013.01); *B60R 21/2342* (2013.01); *B60R 2021/0041* (2013.01); *B60R 2021/0044* (2013.01); *B60R 2021/0048* (2013.01); *B60R 2021/0051* (2013.01); *B60R 2021/0053* (2013.01); *B60R 2021/0055* (2013.01); *B60R 2021/0058* (2013.01); *B60R 2021/01027* (2013.01); *B60R 2021/23386* (2013.01)

(58) Field of Classification Search
CPC .......... B60R 21/207; B60R 2021/2074; B60R 2021/2076; B60R 21/2338; B60R 2021/23386; B60R 2021/23388; B60R 21/2342; B60R 21/2165
See application file for complete search history.

(56) References Cited

U.S. PATENT DOCUMENTS

| | | | | |
|---|---|---|---|---|
| 3,218,103 | A * | 11/1965 | Boyce | ..................... B60R 21/16 128/DIG. 20 |
| 3,753,576 | A * | 8/1973 | Gorman | ................. B60R 21/207 280/730.1 |
| 3,953,049 | A * | 4/1976 | Surace | .................... B60R 21/08 280/730.1 |

(Continued)

FOREIGN PATENT DOCUMENTS

| | | |
|---|---|---|
| DE | 102014004185 A1 | 9/2015 |
| FR | 2927592 B1 | 3/2010 |
| GB | 2364674 B | 9/2003 |

*Primary Examiner* — Frank B Vanaman
(74) *Attorney, Agent, or Firm* — Frank A. MacKenzie; Bejin Bieneman PLC

(57) ABSTRACT

A seat includes a seatback including a top portion, a seat bottom coupled to the seatback, an airbag, a tether fixed to the seatback below the top portion and attached to the airbag, and an airbag extension. The airbag is inflatable from an undeployed position in the top portion to a deployed position attached to the top portion and extending in front of a front panel of the seatback. The airbag extension is inflatable from the airbag in the deployed position in front of the seat bottom.

16 Claims, 11 Drawing Sheets

(56) References Cited

U.S. PATENT DOCUMENTS

| | | | | |
|---|---|---|---|---|
| 6,030,036 A | * | 2/2000 | Fohl | B60R 21/207 |
| | | | | 297/216.14 |
| 6,273,463 B1 | * | 8/2001 | Peterson | B60R 21/276 |
| | | | | 137/512.1 |
| 6,308,917 B1 | * | 10/2001 | Ruff | B64D 25/02 |
| | | | | 244/122 AG |
| 6,352,282 B2 | * | 3/2002 | Hirose | B60R 21/18 |
| | | | | 280/733 |
| 6,378,898 B1 | | 4/2002 | Lewis et al. | |
| 6,886,857 B1 | * | 5/2005 | Mishina | B60R 21/2342 |
| | | | | 280/739 |
| 7,722,074 B2 | * | 5/2010 | Sugimoto | B60R 21/207 |
| | | | | 280/728.2 |
| 9,308,883 B1 | | 4/2016 | Schneider | |
| 2002/0020997 A1 | * | 2/2002 | Watanabe | B60R 21/231 |
| | | | | 280/743.1 |
| 2003/0137136 A1 | * | 7/2003 | Welz | B60R 21/268 |
| | | | | 280/741 |
| 2013/0015642 A1 | * | 1/2013 | Islam | B60R 21/207 |
| | | | | 280/730.1 |
| 2013/0093224 A1 | * | 4/2013 | Dainese | B60R 21/207 |
| | | | | 297/216.12 |
| 2014/0327234 A1 | * | 11/2014 | Heurlin | B60R 21/207 |
| | | | | 280/730.1 |
| 2016/0082915 A1 | | 3/2016 | Madaras | |
| 2016/0121839 A1 | * | 5/2016 | Ko | B60R 21/233 |
| | | | | 280/730.1 |
| 2017/0291569 A1 | * | 10/2017 | Sugie | B60R 21/01552 |
| 2018/0222432 A1 | * | 8/2018 | Schneider | B60R 21/214 |
| 2018/0236962 A1 | * | 8/2018 | Ohno | B60R 21/207 |

\* cited by examiner

SEAT WITH AIRBAG

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

DETAILED DESCRIPTION

Figure 1:
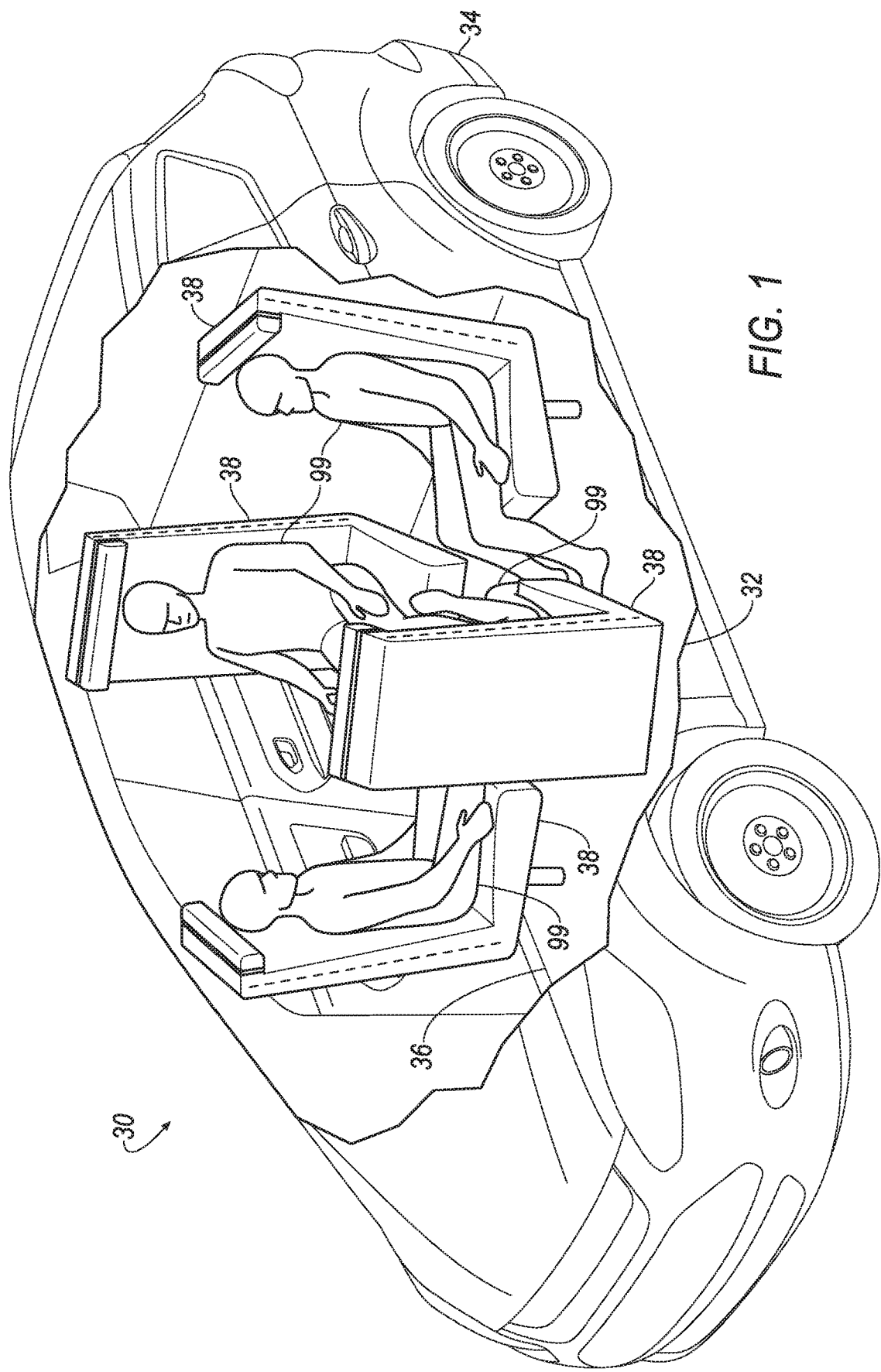
FIG. 1 is a perspective view of a vehicle with a passenger cabin exposed for illustration.

A seat includes a seatback including a top portion, a seat bottom coupled to the seatback, an airbag, a tether fixed to the seatback below the top portion and attached to the airbag, and an airbag extension. The airbag is inflatable from an undeployed position in the top portion to a deployed position attached to the top portion and extending in front of a front panel of the seatback. The airbag extension is inflatable from the airbag in the deployed position in front of the seat bottom.

The tether may define a radial inflation path for the airbag, and the path may be centered where the tether is fixed to the seatback. The seatback may include a side panel, and the tether may be movable from an undeployed position covered by the side panel to the airbag in the undeployed position, to a deployed position extending out of the side panel to the airbag in the deployed position. The side panel may include a frangible seam extending along the tether in the undeployed position. The side panel may be a first side panel, and the seatback may include a second side panel opposite the first side panel, and the tether may extend from the first side panel to the second side panel. The seatback may include a front panel extending from the first side panel to the second side panel, and the airbag in the deployed position may extend between the tether and the front panel. The airbag may include a main body and a first wing and a second wing, and when the airbag is in the deployed position, the first wing may extend from the main body toward the first side panel, and the second wing may extend from the main body toward the second side panel. When the airbag is in the deployed position, the wings may extend between the tether and the front panel.

The airbag may include an inflation chamber, a main shell surrounding the inflation chamber, and a reinforcement panel extending between the tether and the main shell and attached to the main shell.

The airbag may include an outer shell portion, and the tether may be attached to the outer shell portion. The outer shell portion may extend between the tether and the front panel of the seatback when the airbag is in the deployed position, and the tether may extend between the outer shell portion and the front panel of the seatback when the airbag is in an undeployed position.

The tether may be a first tether, and the seat may further comprise a second tether fixed to the seatback below the top portion and attached to the airbag extension. The first tether may be fixed to the seatback at a first attachment point, and the second tether may be fixed to the seatback at a second attachment point below the first attachment point. The airbag extension may be inflatable from an undeployed position folded against the airbag to a deployed position extending from the airbag in front of the seat bottom, and the second tether may be movable from an undeployed position to a deployed position, and the second tether in the undeployed position may extend from the second attachment point to the first attachment point to the airbag extension in the undeployed position with the airbag in the undeployed position, and the second tether in the deployed position may extend from the second attachment point to the airbag extension in the deployed position. The second tether in the deployed position may be spaced from the first attachment point. The second tether may be movable from the undeployed position to an intermediate position to the deployed position, and the second tether in the intermediate position may extend from the second attachment point to the first attachment point to the airbag extension in the undeployed position with the airbag in the deployed position. The seatback may include a first side panel and a second side panel opposite the first side panel, and the second tether may extend from the first side panel to the second side panel. The airbag extension in the deployed position may extend between the second tether and the seat bottom. The airbag extension may include an inflation chamber, an extension shell surrounding the inflation chamber, and a reinforcement panel extending between the second tether and the extension shell and attached to the extension shell.

The airbag in the deployed position may extend more than halfway from the top portion to the seat bottom.

The seat having the airbag and the airbag extension provides the benefits of airbag protection regardless of the orientation of the seat. In the event of an impact, the airbag and the airbag extension can deploy and may prevent a secondary impact between an occupant sitting in the seat and a component of a passenger cabin of the vehicle, such as a dashboard, window, or pillar. Moreover, also in the event of an impact, the airbag and the airbag extension may prevent or decrease the severity of loose objects in the passenger cabin striking the occupant. The seat having the airbag and the airbag extension may thus reduce injuries to the occupant during an impact.

With reference to FIG. 1, a vehicle 30 may be an autonomous vehicle. A computer (not shown) can be configured to operate the vehicle 30 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

The vehicle 30 includes a passenger cabin 32. The passenger cabin 32 houses occupants 99, if any, of the vehicle 30. The passenger cabin 32 may be surrounded and/or defined by a body 34 of the vehicle 30. A floor 36 may define a bottom of the passenger cabin 32. The passenger cabin 32 includes one or more seats 38 for occupants 99 of the vehicle 30 disposed on the floor 36 and coupled to the floor 36.

With reference to FIGS. 1-10, the seats 38 may be bucket seats, as shown in the Figures, bench seats, or another type of seat. Each seat 38 defines a front direction as a direction faced by an occupant 99 sitting in the seat 38. As shown in FIG. 1, the seats 38 may be rotatably coupled to the floor 36. The seats 38 may each be rotatable about a vertical axis relative to the passenger cabin 32. Each seat 38 may face a vehicle-forward direction, a vehicle-rearward direction, or any direction in between. Whichever direction the seat 38 is facing is the front direction relative to the seat 38.

The seat 38 may include a seatback 40, a seat bottom 42 coupled to the seatback 40, and a headrest 44 coupled to the seatback 40. The headrest 44 may be supported by the seatback 40 and may be stationary or movable relative to the seatback 40. The seatback 40 may be supported by the seat bottom 42 and may be stationary or movable relative to the seat bottom 42. The seatback 40, the seat bottom 42, and/or the headrest 44 may be adjustable in multiple degrees of freedom. Specifically, the seatback 40, the seat bottom 42, and/or the headrest 44 may themselves be adjustable, in other words, have adjustable components within the seatback 40, the seat bottom 42, and/or the headrest 44, and/or may be adjustable relative to each other.

Figure 2:
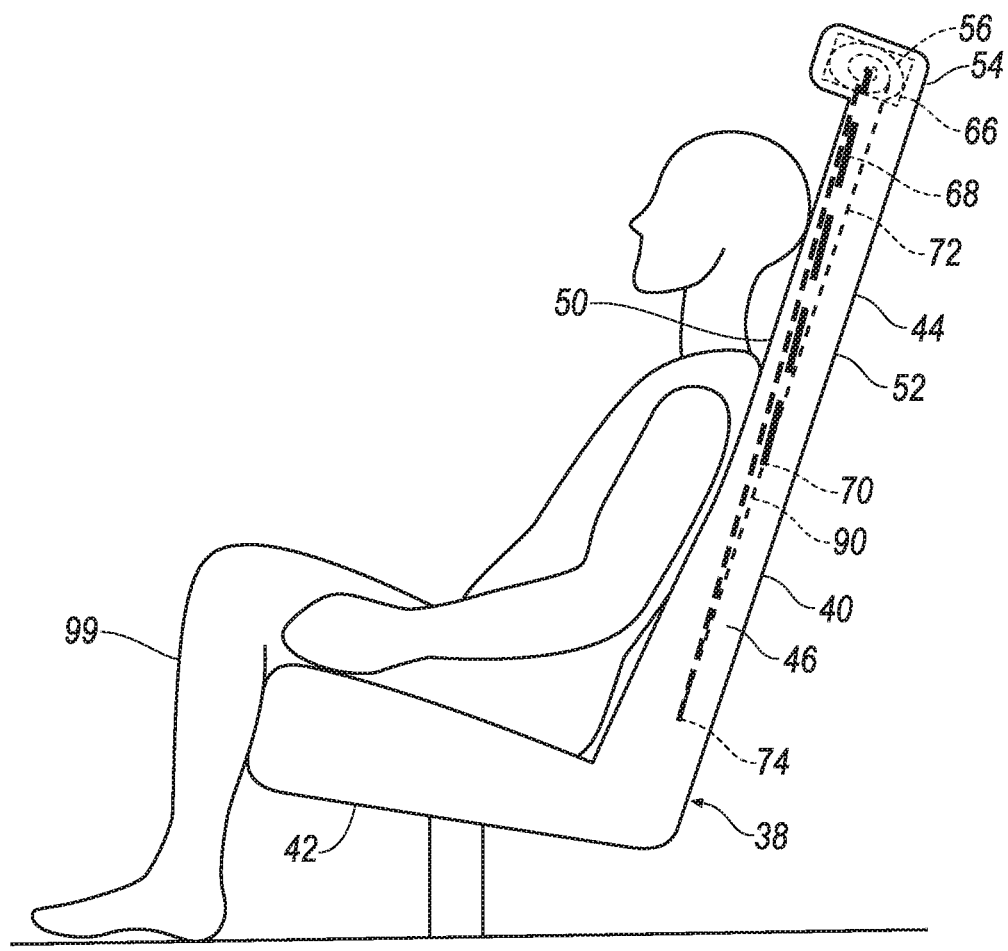
FIG. 2 is a side view of a seat of the passenger cabin having an airbag in an undeployed position.
Figure 3:
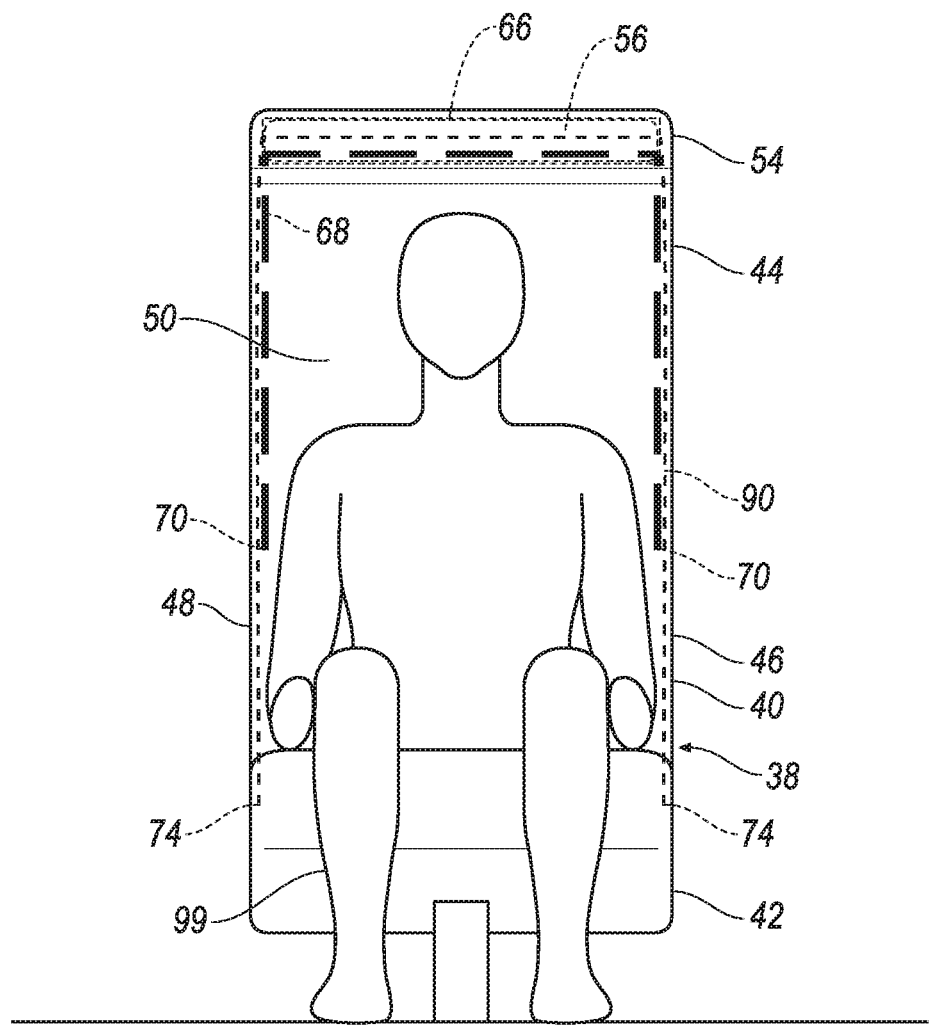
FIG. 3 is a front view of the seat having the airbag in the undeployed position.
Figure 4:
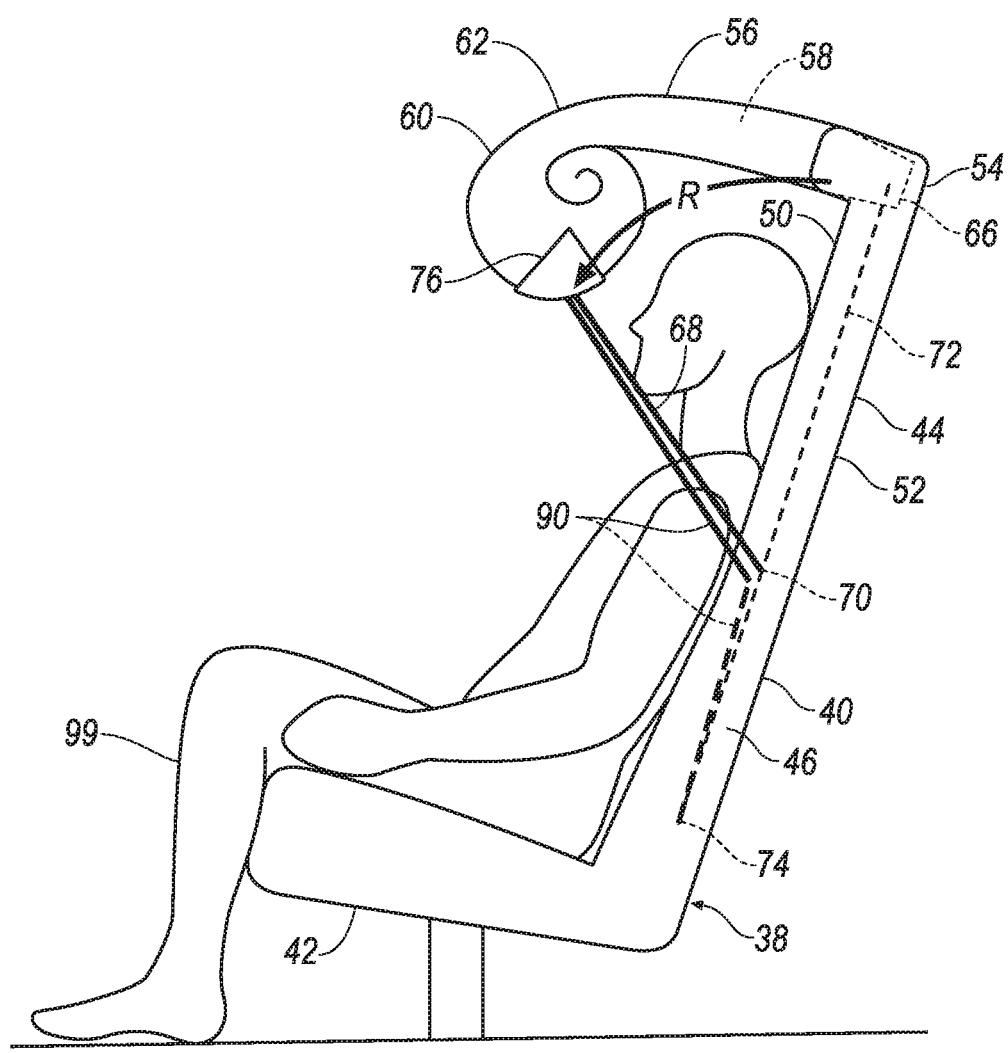
FIG. 4 is a side view of the seat having the airbag in a partially deployed position.
Figure 5:
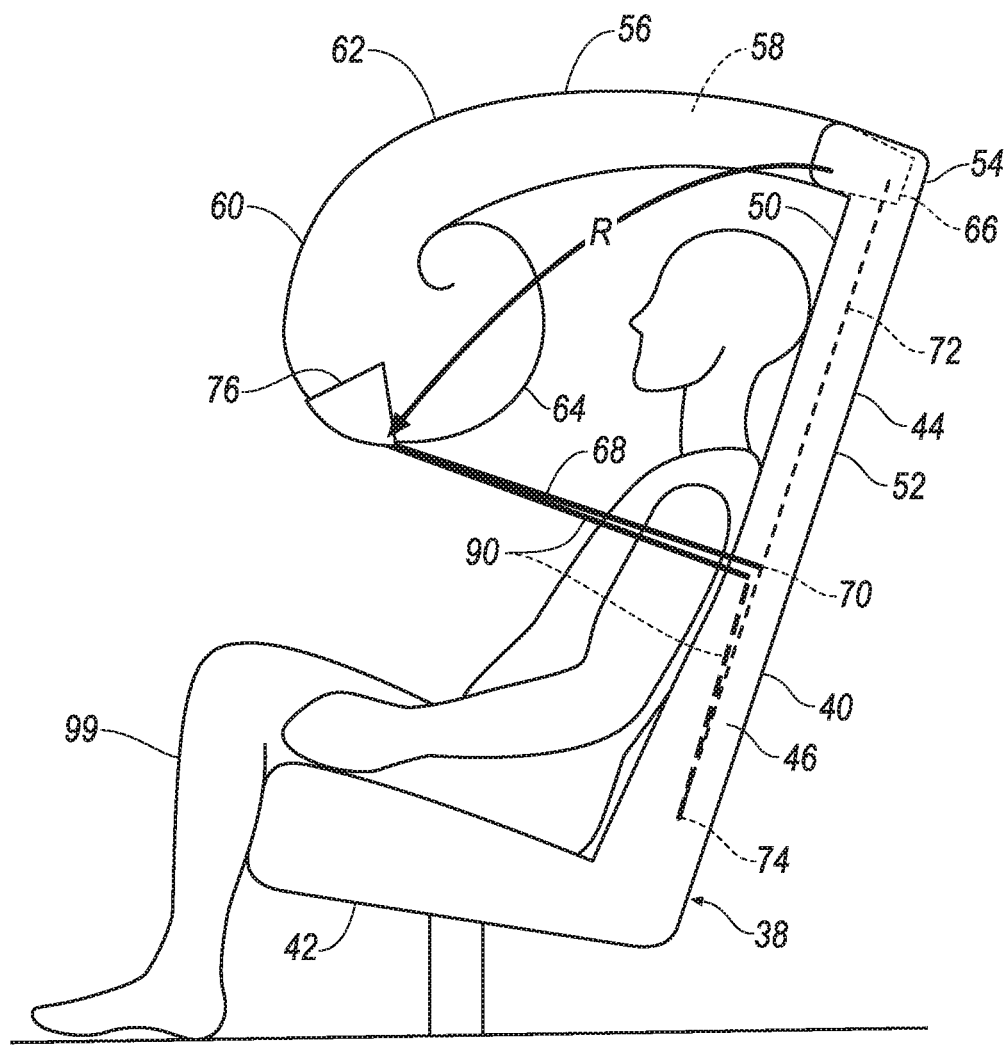
FIG. 5 is a side view of the seat having the airbag in another partially deployed position.

With reference to FIGS. 2 and 3, the seatback 40 includes a first side panel 46, a second side panel 48 opposite the first side panel 46, a front panel 50 extending from the first side panel 46 to the second side panel 48, and a back panel 52 extending from the first side panel 46 to the second side panel 48. (The adjectives "first" and "second" are used throughout this document as identifiers and are not intended to signify importance or order.) The front panel 50 faces in the front direction relative to the seat 38. The back panel 52 faces backward relative to the seat 38, i.e., an opposite direction to the front direction. The first side panel 46 and the second side panel 48 face laterally relative to the seat 38. The seatback 40 includes a top portion 54, which is the uppermost section of the seatback 40, i.e., a vehicle-upward end of the seatback 40. The top portion 54 may be part of the front panel 50 of the seatback 40. In such a configuration, the top portion 54 and the front panel 50 face in the same direction, specifically, face forward relative to the seat 38.

With reference to FIGS. 2-10, the seatback 40 includes an airbag 56. The airbag 56 is inflatable from an undeployed position, as shown in FIGS. 2 and 3, to a deployed position, as shown in FIGS. 6-10. The airbag 56 includes an inflation chamber 58 and a main shell 60 surrounding and defining the inflation chamber 58. The main shell 60 may be formed of panels stitched together (not shown). The main shell 60 includes an outer shell 62 and an inner shell 64. When the airbag 56 is in the deployed position, the outer shell 62 faces away from the seat 38, i.e., front relative to the seat 38, and the inner shell 64 faces toward the seat 38, i.e., presses against the occupant 99 of the seat 38. The outer shell 62 and the inner shell 64 may or may not correspond to the panels of the airbag 56.

The airbag 56, i.e., the panels of the airbag 56, may be formed of any suitable airbag material, for example, a woven polymer. For example, the airbag 56 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With reference to FIGS. 2 and 3, the airbag 56 is inflatable from the undeployed position in the top portion 54. In the undeployed position, the airbag 56 is disposed in a housing 66 disposed in the top portion 54 of the seatback 40. In the undeployed position, the airbag 56 may be coiled or folded, and the outer shell 62 or portions of the outer shell 62 may be closer to the occupant 99 than the inner shell 64 or portions of the inner shell 64 (i.e., the reverse of when the airbag 56 is in the deployed position).

With reference to FIGS. 2-10, a first tether 68 is fixed to the seatback 40 below the top portion 54 and attached to the airbag 56. The first tether 68 extends from the first side panel 46 to the second side panel 48. More specifically, one end of the first tether 68 is attached to a first attachment point 70 at the first side panel 46, and the other end of the first tether 68 is attached to a first attachment point 70 at the second side panel 48. The positions of the two first attachment points 70 may be symmetrical about the seat 38. Between the two first attachment points 70, the first tether 68 is attached to the airbag 56. The first tether 68 is movable from an undeployed position when the airbag 56 is in the undeployed position to a deployed position when the airbag 56 is in the deployed position.

With reference to FIGS. 2 and 3, in the undeployed position, the first tether 68 extends from one of the first attachment points 70 beneath one of the side panels 46, 48 to the airbag 56, and from the airbag 56 beneath the other of the side panels 46, 48 to the other of the first attachment points 70. The portions of the first tether 68 extending beneath the side panels 46, 48 are covered by the side panels 46, 48. The first tether 68 extends between the outer shell 62 portion and the front panel 50 of the seatback 40 when the airbag 56 is in the undeployed position; in other words, at least some of the outer shell 62 is farther from the front panel 50 than the portion of the first tether 68 attached to the airbag 56 when the airbag 56 is in the undeployed position.

Figure 6:
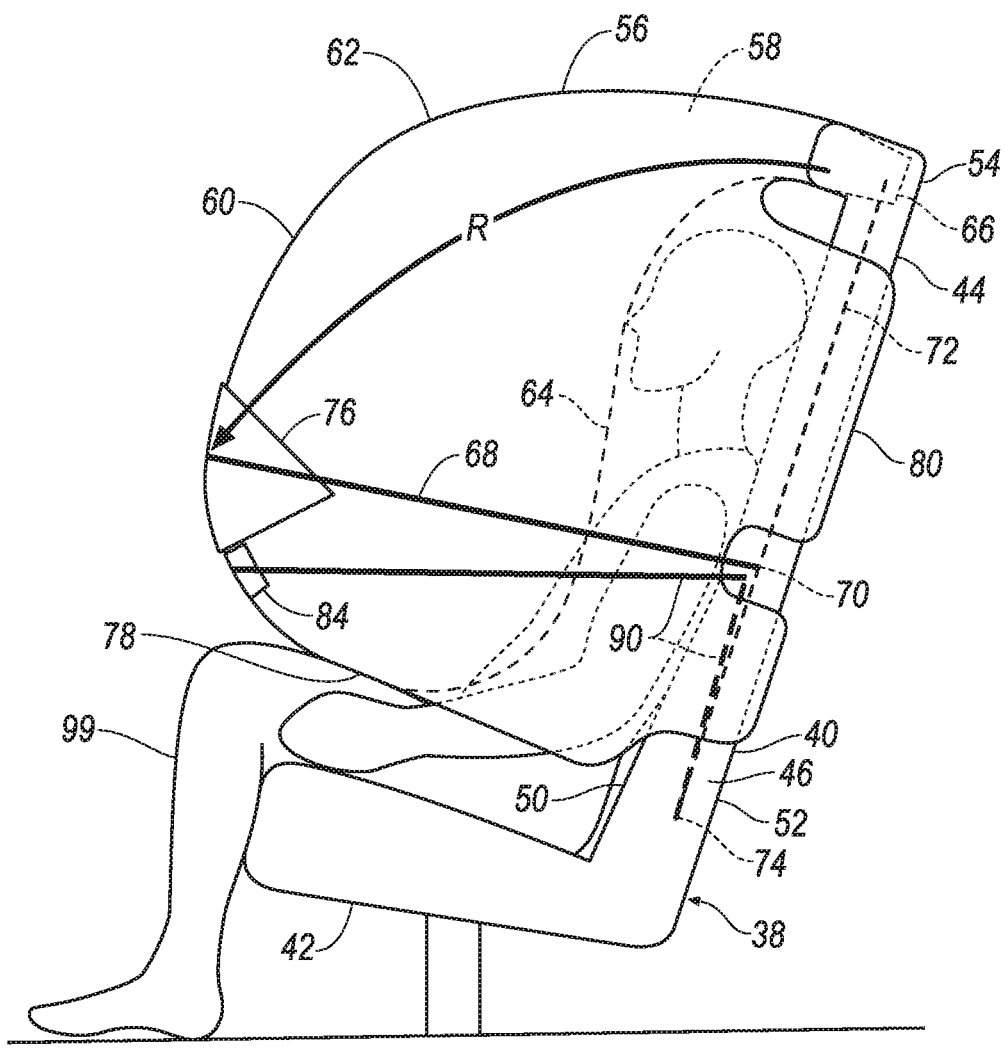
FIG. 6 is a side view of the seat having the airbag in a deployed position and an airbag extension in an undeployed position.
Figure 7:
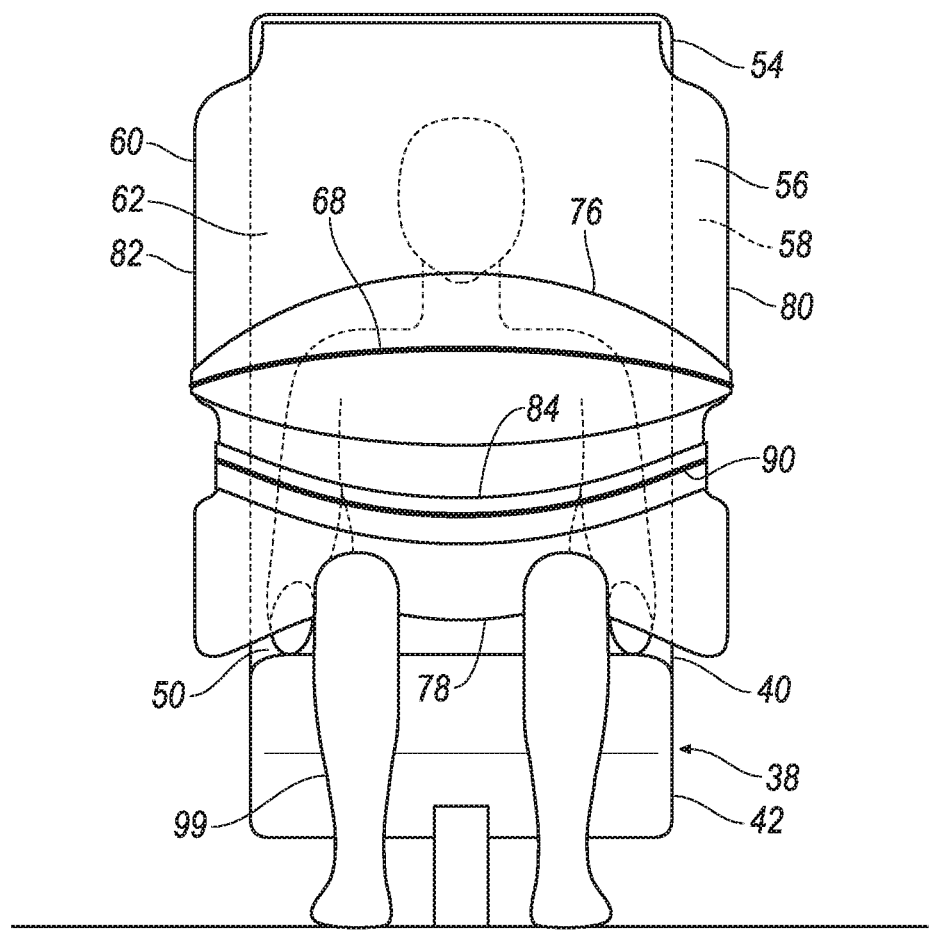
FIG. 7 is a front view of the seat having the airbag in the deployed position and the airbag extension in the undeployed position.
Figure 8:
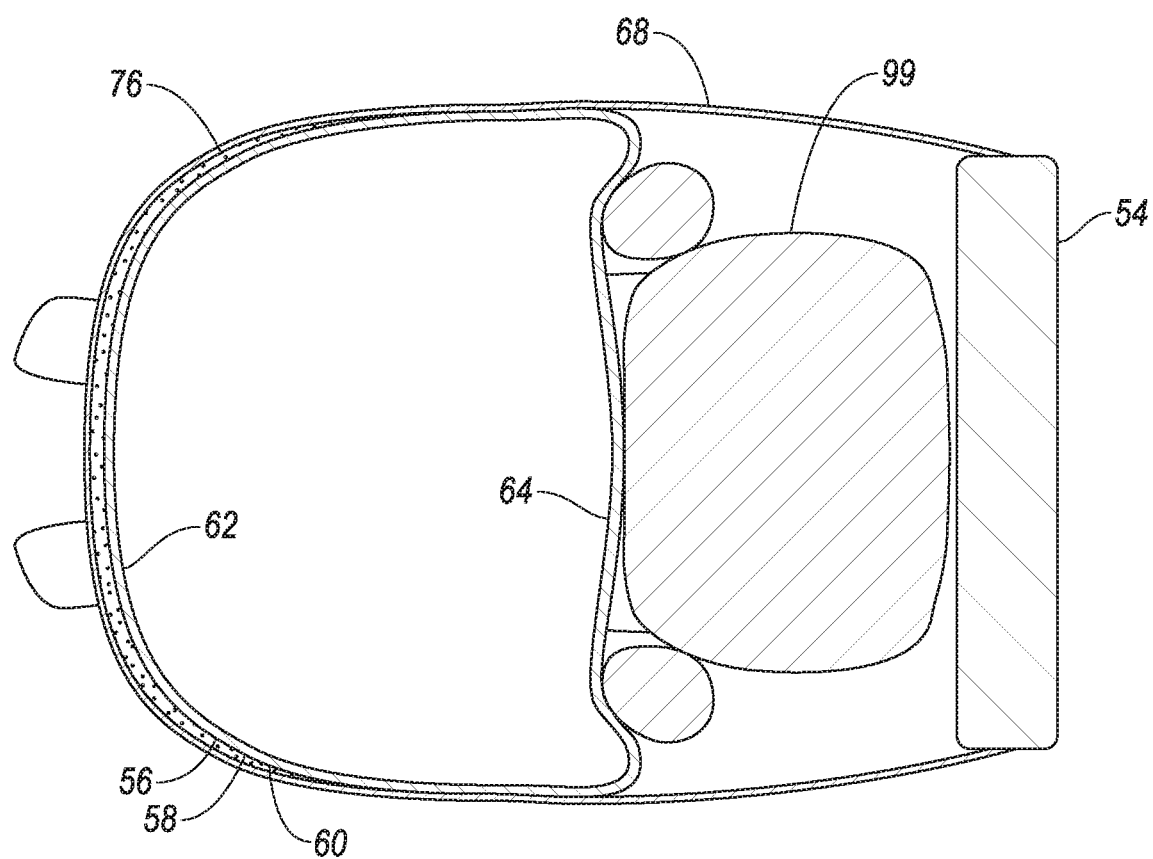
FIG. 8 is a cross-sectional view of the seat having the airbag in the deployed position.

With reference to FIGS. 2, 4-6, and 9, the side panels 46, 48 each include a frangible seam 72 extending along the first tether 68 in the undeployed position. The seams 72 may extend substantially vertically along each side panel 46, 48. The portions of the first tether 68 extending beneath the side panels 46, 48 extend substantially parallel to the seams 72. Each seam 72 may extend from the first attachment point 70 or from a second attachment point 74 to the top portion 54. The seams 72 are frangible relative to the rest of the side panels 46, 48, i.e., tear or separate at a lower tensile stress than the tensile stress at which the rest of the side panel 46, 48 tears or separates. For example, the seams 72 may each be a series of perforations, may each be a line of material thinner than the rest of the side panels 46, 48, etc. With reference to FIGS. 6-8, the airbag 56 is inflatable to the deployed position attached to the top portion 54 and extending in front of the front panel 50. The airbag 56 may extend completely laterally across the front panel 50, i.e., extend laterally past the first side panel 46 and past the second side panel 48. The airbag 56 extends to legs of the occupant 99. The airbag 56 extends most of the way from the top portion 54 to the seat bottom 42, e.g., extends more than halfway from the top portion 54 to the seat bottom 42.

As set forth below, the airbag extension 84 extends from the airbag 56 when the airbag 56 and the airbag extension 84 are in the deployed position. In the deployed position, the seatback 40, the seat bottom 42, the airbag 56, and the airbag extension 84 surround the occupant 99 to absorb energy from the occupant regardless of the direction of impact, e.g., side impact, front impact, rear impact, rollover impact, etc., and regardless of the position of the seat 38, i.e., the direction the seat 38 faces. The seatback 40, the seat bottom 42, the airbag 56, and the airbag extension 84 allows the seat 38 to be designed without seat belts. In other words, seatback 40, the seat bottom 42, the airbag 56, and the airbag extension 84 restrain the occupant 99 so that a seat belt is not needed, i.e., the seat 38 may be designed without a seat belt or the occupant 99 may opt to not use the seat belt in certain conditions. Since the airbag 56 deploys from the top portion 54 of the seatback 40, the airbag 56 retains the occupant 99 on the seat 38 during rollover events.

The airbag 56 in the deployed position extends between the first tether 68 and the seatback 40. More specifically, the outer shell 62 portion extends between the first tether 68 and the front panel 50 of the seatback 40 when the airbag 56 is in the deployed position. In other words, the portion of the first tether 68 that is attached to the airbag 56 is farther from the front panel 50 of the seatback 40 than the outer shell 62 when the airbag 56 is in the deployed position (as opposed to the outer shell 62 being farther away from the front panel 50 of the seatback 40 than the portion of the first tether 68 attached to the airbag 56 when the airbag 56 is in the undeployed position).

With continued reference to FIGS. 6-8, in the deployed position, the first tether 68 extends out of one of the side panels 46, 48 to the airbag 56 in the deployed position to the other of the side panels 46, 48. The first tether 68 extends in the front direction from the first attachment points 70 and extends laterally across the airbag 56. The first tether 68 extends outside the airbag 56 relative to the seatback 40. The first tether 68 extends around the outer shell 62 of the airbag 56. The first tether 68 constrains the airbag 56 against the occupant 99 pushing into the airbag 56 during an impact.

With reference to FIGS. 2 and 4-6, the first tether 68 defines a radial inflation path R for the airbag 56. The radial inflation path R is centered around the first attachment points 70, i.e., centered where the first tether 68 is fixed to the seatback 40. As the airbag 56 uncoils or unfolds between the undeployed position and the deployed position, the outer shell 62 moves from outside the portion of the first tether 68 attached to the airbag 56 relative to the front panel 50 of the seatback 40, to inside the portion of the first tether 68 attached to the airbag 56 relative to the front panel 50 of the seatback 40. In other words, the outer shell 62 rotates about the portion of the first tether 68 attached to the airbag 56 during inflation.

With reference to FIGS. 4-10, the airbag 56 may include a first reinforcement panel 76 extending between the first tether 68 and the main shell 60 and attached to the main shell 60. More specifically, the first reinforcement panel 76 may be attached to the outer shell 62. The first reinforcement panel 76 extends on an outer surface of the outer shell 62. In other words, the first reinforcement panel 76 does not define the inflation chamber 58, and the outer shell 62 extends completely between the first reinforcement panel 76 and the inflation chamber 58. The first reinforcement panel 76 is an additional layer of material such that the airbag 56 has a thicker wall where the first reinforcement panel 76 is disposed on the main shell 60 than for the rest of the main shell 60. The first reinforcement panel 76 may be formed of the same material as the main shell 60 or of a different material.

Figure 9:
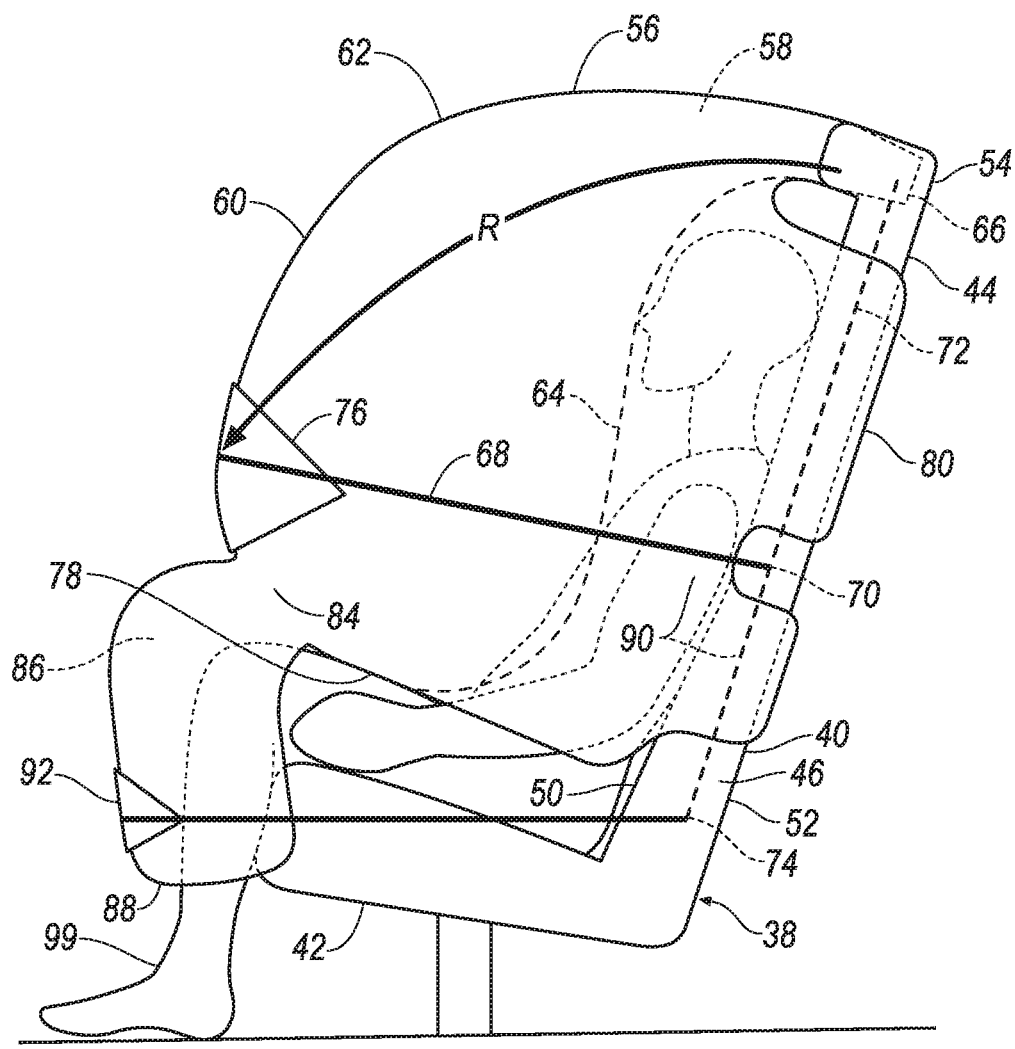
FIG. 9 is a side view of the seat having the airbag in the deployed position and the airbag extension in a deployed position.

With reference to FIGS. 6 and 9, in the deployed position, the airbag 56 includes a main body 78, a first wing 80, and a second wing 82. The main body 78 is disposed in front of the front panel 50 of the seatback 40 and in front of the occupant 99. When the airbag 56 is in the deployed position, the first wing 80 extends from the main body 78 toward the first side panel 46, and the second wing 82 extends from the main body 78 toward the second side panel 48. The wings 80, 82 extend between the first tether 68 and the front panel 50. The wings 80, 82 extend beside arms of the occupant 99. The wings 80, 82 extend between the first tether 68 and the occupant 99.

Figure 10:
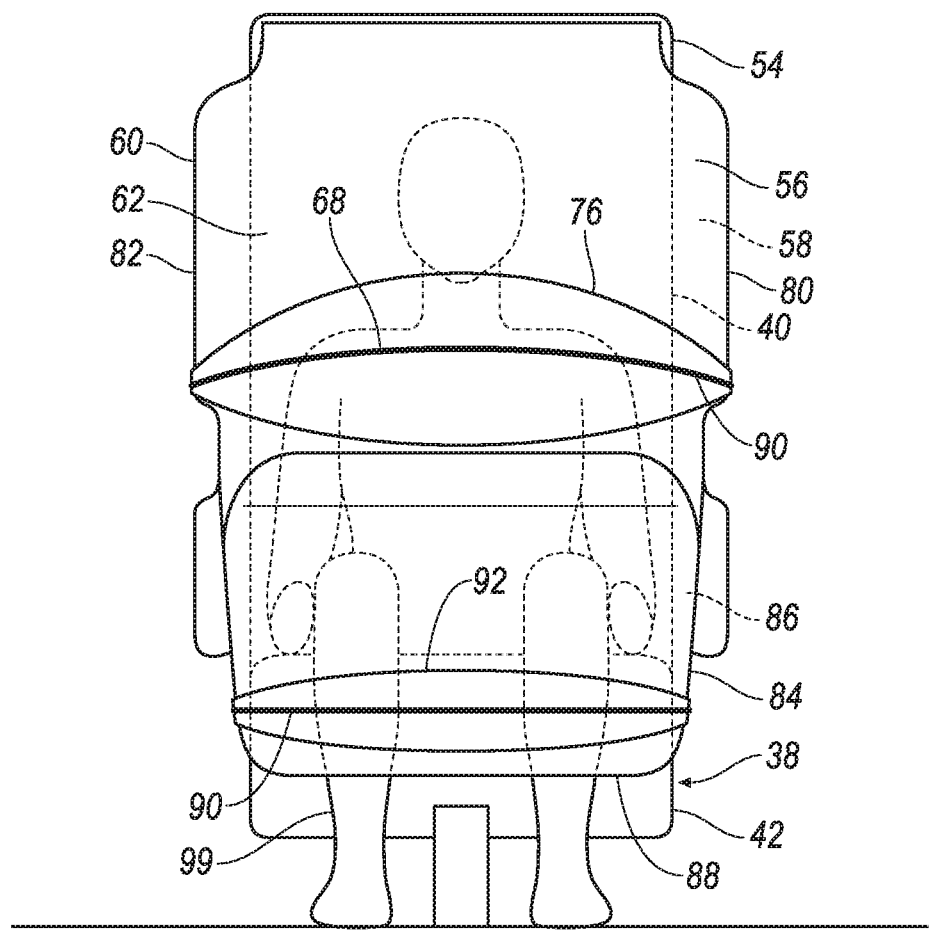
FIG. 10 is a front view of the seat having the airbag in the deployed position and the airbag extension in the deployed position.

With reference to FIGS. 6-7 and 9-10, an airbag extension 84 is attached to the airbag 56. The airbag extension 84 is inflatable from an undeployed position, as shown in FIGS. 6 and 7, to a deployed position, as shown in FIGS. 9 and 10. The airbag extension 84 includes an inflation chamber 86 and an extension shell 88 surrounding and defining the inflation chamber 86. The inflation chamber 86 of the airbag extension 84 is in communication with the inflation chamber 58 of the airbag 56. The extension shell 88 may be formed of panels stitched together (not shown). The airbag extension 84 may be formed of the same material as the airbag 56 or of a different material.

With reference to FIGS. 6 and 7, in the undeployed position, the airbag extension 84 is folded against the airbag 56. The airbag 56 may be in the undeployed position or in the deployed position.

A second tether 90 may be fixed to the seatback 40 below the top portion 54 and attached to the airbag extension 84. The second tether 90 extends from the first side panel 46 to the second side panel 48. More specifically, one end of the second tether 90 is attached to the second attachment point 74 at the first side panel 46, and the other end of the second tether 90 is attached to the second attachment point 74 at the second side panel 48. The positions of the two second attachment points 74 may be symmetrical about the seat 38, and the positions of the two second attachment points 74 may be below the first attachment points 70. Between the second attachment points 74, the second tether 90 is attached to the airbag extension 84. The second tether 90 is movable from an undeployed position to an intermediate position to a deployed position.

With reference to FIG. 2, the second tether 90 in the undeployed position extends from the second attachment point 74 to the first attachment point 70 to the airbag extension 84 in the undeployed position with the airbag 56 in the undeployed position. In the undeployed position, the second tether 90 extends from one of the second attachment points 74 to the corresponding first attachment point 70 beneath the corresponding side panel 46, 48 to the airbag extension 84, and from the airbag 56 beneath the other of the side panels 46, 48 to the other of the first attachment points 70 to the other of the second attachment points 74. The portions of the second tether 90 extending beneath the side panels 46, 48, i.e., from the second attachment point 74 to the first attachment point 70 to the airbag extension 84, are covered by the side panels 46, 48. The portions of the second tether 90 extending beneath the side panels 46, 48 extend substantially parallel to the seams 72.

With reference to FIG. 6, in the intermediate position, the second tether 90 extends from the second attachment point 74 to the first attachment point 70 to the airbag extension 84 in the undeployed position with the airbag 56 in the deployed position. The second tether 90 extends beneath the side panels 46, 48 from the second attachment points 74 to the corresponding first attachment points 70, extends out of the side panels 46, 48 in the front direction from the first attachment points 70, and extends laterally across the airbag 56 in the deployed position and across the airbag extension 84 in the undeployed position.

With reference to FIGS. 9 and 10, the airbag extension 84 is inflatable to the deployed position extending from the airbag 56 in front of the seat bottom 42. The airbag extension 84 may extend completely laterally across a front of the seat bottom 42. The airbag extension 84 may extend most of the way from the airbag 56 to the floor 36 of the passenger cabin 32, e.g., may extend more than halfway from the airbag 56 to the floor 36. The airbag extension 84 may extend in front of legs of the occupant 99. The airbag extension 84 may extend between the second tether 90 and the seat bottom 42.

With continued reference to FIGS. 9 and 10, in the deployed position, the second tether 90 extends out of one of the side panels 46, 48 to the airbag extension 84 in the deployed position to the other of the side panels 46, 48. The second tether 90 extends in the front direction from the second attachment points 74 and extends laterally across the airbag extension 84. The second tether 90 has detached from the first attachment points 70, and thus the second tether 90 is spaced from the first attachment points 70. The second tether 90 extends outside the airbag extension 84 relative to the seat bottom 42. The second tether 90 constrains the airbag extension 84 against the legs of the occupant 99 pushing into the airbag extension 84 during an impact.

With reference to FIG. 9, a second reinforcement panel 92 may extend between the second tether 90 and the extension shell 88 and be attached to the extension shell 88. The second reinforcement panel 92 extends on an outer surface of the extension shell 88. In other words, the second reinforcement panel 92 does not define the inflation chamber 86, and the extension shell 88 extends completely between the second reinforcement panel 92 and the inflation chamber 86. The second reinforcement panel 92 is an additional layer of material such that the airbag extension 84 has a thicker wall where the first reinforcement panel 76 is disposed on the extension shell 88 than for the rest of the extension shell 88. The second reinforcement panel 92 may be formed of the same material as the extension shell 88 or of a different material.

Figure 11:
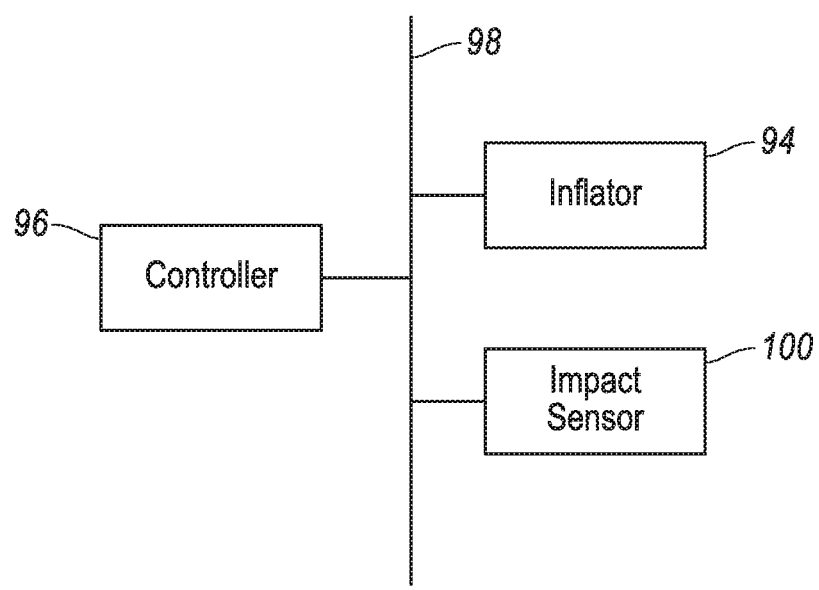
FIG. 11 is a block diagram of a control system of the airbag.

With reference to FIG. 11, an inflator 94 may be connected to the airbag 56 and in communication with the inflation chamber 58 of the airbag 56 and the inflation chamber 86 of the airbag extension 84. Upon receiving a signal from, e.g., a controller 96, the inflator 94 may inflate the airbag 56 and the airbag extension 84 with an inflatable medium, such as a gas. Specifically, the inflator 94 inflates the inflation chamber 58 of the airbag 56 and the inflation chamber 86 of the airbag extension 84. The inflator 94 may be, for example, a pyrotechnic inflator that uses a chemical reaction to drive inflation medium to the airbag 56. The inflator 94 may be of any suitable type, for example, a cold-gas inflator.

The controller 96 is a microprocessor-based controller. The controller 96 includes a processor, memory, etc. The memory of the controller 96 includes memory for storing instructions executable by the processor as well as for electronically storing data and/or databases. The controller 96 may be the same or a different device than the computer responsible for autonomously controlling the vehicle 30.

The controller 96 may transmit signals through a communications network 98 such as a controller area network (CAN) bus, Ethernet, WiFi, Local Interconnect Network (LIN), onboard diagnostics connector (OBD-II), and/or by any other wired or wireless communications network. The controller 96 may be in communication with the inflator 94 and an impact sensor 100 via the communications network 98.

With continued reference to FIG. 11, the impact sensor 100 is adapted to detect an impact to the vehicle 30. The impact sensor 100 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 100 may be located at numerous points in or on the vehicle 30.

In the event of an impact to the vehicle 30, the impact sensor 100 may detect the impact and transmit a signal through the communications network 98 to the controller 96. The controller 96 may transmit a signal through the communications network 98 to the inflator 94. The inflator 94 may discharge and inflate the airbag 56. During inflation, the airbag 56 uncoils or unfolds in front of the occupant 99 of the seat 38. The outer shell 62 of the airbag 56 that is attached to the first tether 68 uncoils or unfolds along the radial inflation path R as the first tether 68 and the second tether 90 tear through the seams 72 between the first attachment points 70 and the top portion 54. The inner shell 64 of the airbag 56 in the undeployed position is farther from the front panel 50 of the seatback 40 than the outer shell 62, and the inner shell 64 of the airbag 56 in the deployed position is closer to the front panel 50 than the seatback 40. A centroid of the airbag 56 thus deploys more downward than forward relative to the seatback 40, keeping the airbag 56 closer to a torso of the occupant 99 during deployment. When the airbag 56 is fully deployed, the airbag extension 84 deploys. The uncoiling or unfolding of the airbag 56 may prevent inflation medium from inflating the airbag extension 84 until the airbag 56 is fully or mostly deployed. The airbag extension 84 deploys downward and forward in front of the seat bottom 42 and shins of the occupant 99. The second tether 90 tears through the seams 72 between the first attachment points 70 and the second attachment points 74. The second tether 90 guides the airbag extension 84 more downward than forward and keeps the airbag extension 84 closer to the shins of the occupant 99. The airbag 56 and the airbag extension 84 may thus mostly extend around exposed portions of the occupant 99, providing protection during an impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. "Substantially" as used herein means that a dimension, time duration, shape, or other adjective may vary slightly from what is described due to physical imperfections, power interruptions, variations in machining or other manufacturing, etc.

What is claimed is:

1. A seat, comprising:
    a seatback including a top portion, a first side panel, a second side panel opposite the first side panel, and a front panel extending from the first side panel to the second side panel;
    a seat bottom coupled to the seatback;
    an airbag inflatable to a deployed position, the airbag in the deployed position being attached to the top portion and extending in front of the seatback, the airbag including an outer shell portion;
    a tether fixed to the seatback below the top portion and attached to the outer shell portion of the airbag; and
    an airbag extension inflatable from the airbag in the deployed position, the airbag extension upon inflation being disposed in a forward direction from the seat bottom;
    wherein the tether defines a radial inflation path for the airbag, the path centered where the tether is fixed to the seatback;
    the tether extends from the first side panel to the second side panel;
    the tether is movable from an undeployed position covered by the first side panel to the airbag in the undeployed position, to a deployed position extending out of the first side panel to the airbag in the deployed position;
    the first side panel includes a frangible seam extending along the tether in the undeployed position; and
    the airbag in the deployed position extends between the tether and the front panel.

2. The seat of claim 1, wherein the airbag includes a main body and a first wing and a second wing, and when the airbag is in the deployed position, the first wing extends from the main body toward the first side panel, and the second wing extends from the main body toward the second side panel.

3. The seat of claim 2, wherein when the airbag is in the deployed position, the wings extend between the tether and the front panel.

4. The seat of claim 1, wherein the airbag includes an inflation chamber, a main shell surrounding the inflation chamber, and a reinforcement panel extending between the tether and the main shell and attached to the main shell.

5. The seat of claim 1, wherein the outer shell portion extends between the tether and the front panel of the seatback when the airbag is in the deployed position, and the tether extends between the outer shell portion and the front panel of the seatback when the airbag is in an undeployed position.

6. The seat of claim 1, wherein the tether is a first tether, the seat further comprising a second tether fixed to the seatback below the top portion and attached to the airbag extension.

7. The seat of claim 6, wherein the first tether is fixed to the seatback at a first attachment point, and the second tether is fixed to the seatback at a second attachment point below the first attachment point.

8. The seat of claim 7, wherein the airbag extension is inflatable from an undeployed position folded against the airbag to a deployed position extending from the airbag in front of the seat bottom, the second tether is movable from an undeployed position to a deployed position, the second tether in the undeployed position extends from the second attachment point to the first attachment point to the airbag extension in the undeployed position with the airbag in the undeployed position, and the second tether in the deployed position extends from the second attachment point to the airbag extension in the deployed position.

9. The seat of claim 8, wherein the second tether in the deployed position is spaced from the first attachment point.

10. The seat of claim 9, wherein the second tether is movable from the undeployed position to an intermediate position to the deployed position, and the second tether in the intermediate position extends from the second attachment point to the first attachment point to the airbag extension in the undeployed position with the airbag in the deployed position.

11. The seat of claim 10, wherein the second tether extends from the first side panel to the second side panel.

12. The seat of claim 11, wherein the airbag extension in the deployed position extends between the second tether and the seat bottom.

13. The seat of claim 12, wherein the airbag extension includes an inflation chamber, an extension shell surrounding the inflation chamber, and a reinforcement panel extending between the second tether and the extension shell and attached to the extension shell.

14. The seat of claim 1, wherein the airbag in the deployed position extends more than halfway from the top portion to the seat bottom.

15. A seat, comprising:
    a seatback including a top portion, a first side panel, a second side panel opposite the first side panel, and a front panel extending from the first side panel to the second side panel;
    a seat bottom coupled to the seatback;
    an airbag inflatable to a deployed position, the airbag in the deployed position being attached to the top portion and extending in front of the seatback;
    a tether fixed to the seatback below the top portion and attached to the airbag; and
    an airbag extension inflatable from the airbag in the deployed position, the airbag extension upon inflation being disposed in a forward direction from the seat bottom;
    wherein the tether defines a radial inflation path for the airbag, the path centered where the tether is fixed to the seatback;
    the tether extends from the first side panel to the second side panel;
    the tether is movable from an undeployed position covered by the first side panel to the airbag in the undeployed position, to a deployed position extending out of the first side panel to the airbag in the deployed position;
    the first side panel includes a frangible seam extending along the tether in the undeployed position;
    the airbag in the deployed position extends between the tether and the front panel;
    the airbag includes an inflation chamber, a main shell surrounding the inflation chamber, and a reinforcement panel extending between the tether and the main shell and attached to the main shell.

16. A seat, comprising:
    a seatback including a top portion;
    a seat bottom coupled to the seatback;
    an airbag inflatable to a deployed position, the airbag in the deployed position being attached to the top portion and extending in front of the seatback;
    a first tether fixed to the seatback below the top portion and attached to the airbag;

an airbag extension inflatable from the airbag in the deployed position, the airbag extension upon inflation being disposed in a forward direction from the seat bottom; and a second tether fixed to the seatback below the top portion and attached to the airbag extension;

wherein the first tether is fixed to the seatback at a first attachment point, and the second tether is fixed to the seatback at a second attachment point below the first attachment point.

* * * * *